United States Patent [19]
Van Drie

[11] Patent Number: 6,036,357
[45] Date of Patent: *Mar. 14, 2000

[54] SUBMARINE-TYPE LIQUID MIXER

[76] Inventor: Gerhardt Woodrow Van Drie, 724 W. Pine Ave., El Segundo, Calif. 90245

[*] Notice: This patent is subject to a terminal disclaimer.

[21] Appl. No.: 09/028,843

[22] Filed: Feb. 20, 1998

Related U.S. Application Data

[63] Continuation-in-part of application No. 08/690,221, Jul. 19, 1996, Pat. No. 5,762,418.

[51] Int. Cl.[7] .............................. B01F 11/00; B01F 13/00
[52] U.S. Cl. ............................................ 366/332; 366/101
[58] Field of Search .................................... 366/332, 101, 366/102, 106, 107, 256, 315, 316, 382, 276; 446/155, 153, 156; 261/119.1, 72.1; 210/150

[56] References Cited

U.S. PATENT DOCUMENTS

| | | | |
|---|---|---|---|
| 3,788,616 | 1/1974 | Clough, Jr. ................................. | 261/64 |
| 4,363,212 | 12/1982 | Everett ....................................... | 60/496 |
| 4,595,296 | 6/1986 | Parks ........................................ | 366/106 |
| 4,779,990 | 10/1988 | Hjort ........................................ | 366/102 |
| 4,919,849 | 4/1990 | Litz .......................................... | 261/36.1 |
| 5,156,778 | 10/1992 | Small ........................................ | 261/87 |
| 5,198,156 | 3/1993 | Middleton ................................. | 261/87 |

*Primary Examiner*—Tony G. Soohoo
*Attorney, Agent, or Firm*—Gene Scott-Patent Law & Venture Group

[57] ABSTRACT

The present invention, a submarine-type liquid mixer provides a mixing device that contains a gas-trapping component in the shape of a cap or umbrella with an open bottom, which is centered upon, and slides up and down along a vertical pole-like structure within a vessel containing liquid. When gas is formed naturally in the vessel and is caught under the opening of the cap-shaped component, or is directly pumped into the same, it displaces the liquid volume under the cap-shaped component to the extent that the cap-shaped component, which is also generally the mixing device, has the buoyancy to rise to the top of the vessel. The gas is then released through valving installed on top of the cap-shaped component, causing it to lose it's buoyancy and sink back to the bottom of the tank. This process then repeats itself, the up-and-down movement of the cap-shaped component mixing the liquid. The gas-trapping component may alternately be a mainly closed gas container. In this case, the gas may be introduced or withdrawn through a flexible hose.

15 Claims, 10 Drawing Sheets

SUBMARINE-TYPE LIQUID MIXER

This is a continuation in part (CIP) of utility patent application Ser. No. 08/690,221, filed on Jul. 19, 1996 now U.S. Pat. No. 5,762,418 by the above inventor.

BACKGROUND OF THE INVENTION

1. Field of the Invention

This invention relates generally to mixing devices, and more particularly to a gas-induced mixing device used for the purpose of aerating and agitating a liquid.

2. Description of Related Art

Water, sewage and industrial waste treatment are becoming crucially important in today's ever increasing population. They are also becoming extremely expensive processes, as more and more treatment is required. As such, new treatment means are continually being sought, for improved efficiency and economy in this industry. Aeration and agitation is an integral part of these treatment processes.

The following art defines the present state of this field:

Clough, Jr., U.S. Pat. No. 3,788,616, teaches a "system for simultaneously aerating and agitating a body of liquid. The system comprises a body that is pivotally mounted in the liquid with its pivot point located intermediate its ends, and means for feeding air to the lower side of the body. The body is adapted to trap alternately at each end sufficient air to cause that end to rise in the liquid, and means are provided for releasing the air trapped at each end of the body when that end has risen a predetermined amount, with the result that the body oscillates on its pivot axis in see-saw fashion".

Everett, U.S. Pat. No. 4,363,212, teaches a "buoyancy prime mover that converts the potential energy of a gas buoyant within a liquid into rotating mechanical energy comprises a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power".

Parks, U.S. Pat. No. 4,595,296, teaches an invention which "relates to a mixing and blending system in which pulsed air or gas bubbles of predetermined variable size and frequency are injected into a tank containing materials to be agitated or stirred for mixing or blending. The air introduced at the bottom of the tank through an air inlet opening. There may be more than one air inlet and the inlets may be provided with accumulator plates depending upon diameter and height of the tank in which the mixing and blending is taking place. The inlets are located so as to create circular torroidal flow of fluid in a generally vertical plane. The accumulator plate has the purpose of assisting the formation of essentially a single bubble from the compressed air charge made to the air inlet and increasing the time required for the bubble to rise through the liquid by causing it to be formed more quickly and closer to the bottom of the tank. Hence, the accumulator plate is utilized in low viscosity liquids such as water".

Hjort, et al, U.S. Pat. No. 4,779,990, teaches an "impeller apparatus for dispersing a gas into a liquid in a vessel includes a centrifugal flow turbine, the blades of which are formed with a substantially streamlined trailing surface terminated by a sharply pronounced spine. The blade is formed by a plate-like initial blank being cut to a shape having a central line of symmetry, the blank then being folded along the straight line of symmetry.

Litz, et al, U.S. Pat. No. 4,919,849, teaches a "gas-liquid mixing process and apparatus having a vessel with an axial flow down-pumping impeller in a draft tube has gas ingestion tubes extending into a body of liquid from a hollow portion of the impeller shaft or other fluid communication means with the overhead gas in the vessel. Upon gas-liquid mixing at liquid levels that interfere with vortex development by the impeller, gas is drawn from the overhead through the ingestion tubes into the body of liquid".

Small, U.S. Pat. No. 5,156,788, teaches a "device for use in the mixing of fluids, e.g. the gasification of liquids, comprises an elongate member including an internal passage; and, mounted on the elongate member via radial arms, one or more venturi members each having a convergent-divergent duct whose axis is substantially tangential to the elongate member, and in which the neck of the duct has an opening in communication, via passages in the radial, with the internal passage. On rotation of the device, reduced pressure in the duct neck draws fluid down the shaft of the elongate member".

Middleton, et al, U.S. Pat. No. 5,198,156, teaches a "turbine agitator assembly including a reservoir for liquid, a rotor mounted in the reservoir and with a plurality of radially extending blades, and sparger means for introducing a fluid into liquid in the reservoir. The fluid sparger means and the rotor are so constructed and arranged that, in use, the rotor blades (submerged in the liquid) and/or the liquid flow they generate disperse the sparged fluid. Each of the blades is hollow and has a discontinuous leading edge, only a single trailing edge along an acute angle, no external concave surface and an open radially outer end".

The prior art teaches a variety of means of mixing liquids such as turbines, rotors with blades and other various mechanical devices as well as gas-induced mixing. However, the prior art does not teach a light-weight, mixing device which traps gas bubbles naturally evolved within the liquid, nor one that uses this gas or an induced gas stream to provide the needed mixing. The prior art teaches a non-motorized gas-induced mixing apparatus where gas bubbles are used to aerate and agitate a liquid, and it teaches a non-motorized gas-induced mixing apparatus which uses the gas bubbles as an impetus to move a component through the liquid in order to agitate it as well. The present invention is an improvement on these devices providing advantages in efficiency, control and effectiveness. It fulfills these needs and provides further related advantages as described in the following summary.

SUMMARY OF THE INVENTION

The present invention teaches certain benefits in construction and use which give rise to the objectives described below.

The present invention, a submarine-type liquid mixer provides a mixing device that is centered upon and slides up and down along a pole-like structure within a vessel containing liquid. When gas is formed naturally in the vessel it is caught under an opening of a cap-shaped component, or is directly pumped into this device, it eventually displaces the liquid volume under the cap-shaped component to the extent that it gains the buoyancy to rise to the top of the vessel. The gas is then released through valving installed on top of the cap-shaped component, causing it to lose it's buoyancy and sink back to the bottom of the tank. This process then repeats itself, the up-and-down movement of the cap-shaped component mixing the liquid.

A primary objective of the present invention is to provide a submarine-type liquid mixer for use in large vessels of 55 gallons or more, as well as for in-stream aeration for bodies of water needing treatment, having advantages not taught by the prior art.

Another objective is to reduce overall cost. The initial cost to the user is reduced by the invention's relatively simple design and construction. Relatively little metal is required as opposed to heavy, cumbersome mechanical mixers. Cost is also reduced for the user through energy efficiency and lower operating costs. Unlike mechanical mixers which require considerable electrical power to operate, this invention has an efficient design allowing it to use nature's own processes, i.e., buoyancy and gravity, for the purpose of a mixing function. For instance, in the case of water treatment, the gas produced by anaerobic bacteria is trapped in the cap-like design of the mixing means. This naturally increases the buoyancy of the mixing means and eventually raises the mixing device through the liquid, a trap-door then simply releases the gas when the mixer reaches the top of the vessel, and therefore causes the mixing device to descend naturally on it's own accord. This process of using nature's own processes for the purpose of mixing is obviously very advantageous in that it virtually eliminates operating costs.

A further objective is for this invention to be able to be used for a variety of mixing purposes. For purposes where natural gas bubbles cannot be utilized to generate buoyancy, a means of pumping gas into a cavity within the mixing device is used to create the liquid displacement needed to increase buoyancy. Gas is then pumped out of the cavity when the mixing means reaches the top, thus reducing the buoyancy of the mixer so that it descends back toward the bottom of the vessel. This system of introducing and withdrawing the gas gives the user great control over mixing speed and efficiency. Timers can be used to this end, to control the repetition rate. This simple pumping system is also cost-effective, compared to conventional mechanical mixers.

This invention then has applications in the aeration and agitation for both tanks and bodies of water containing bacteria such as sewage and waste tanks, and those which contain other substances, such as chemicals, oil, and aqueous solutions of all kinds.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE PREFERRED EMBODIMENT

Figure 1:
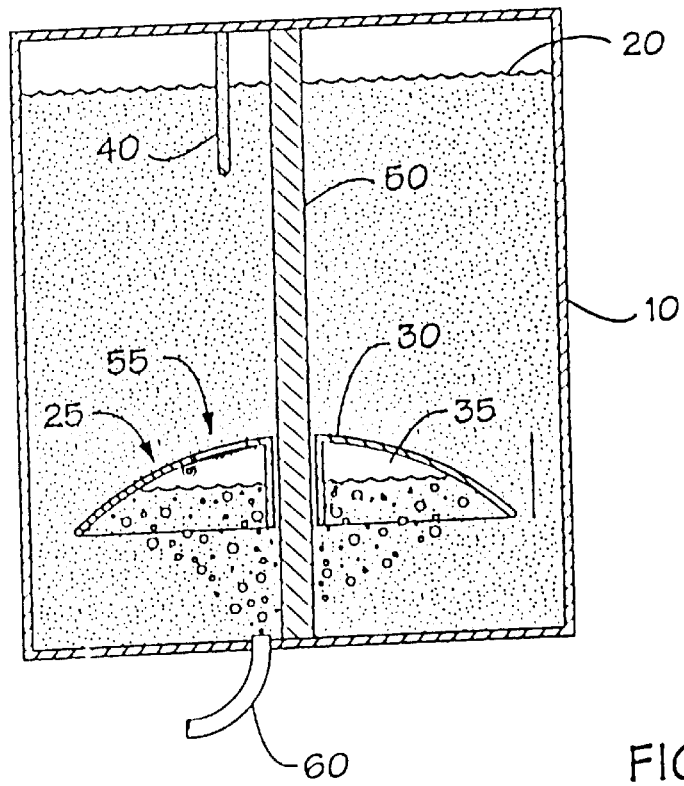
FIG. 1 is a mechanical schematic conception diagram showing a cross-sectional view of a preferred embodiment of the present invention, with the mixing device located near the bottom of a vessel filled with liquid, at the start of a mixing cycle.

The above described drawing figures illustrate the invention, an apparatus for mixing a viscous fluid 20 through the employment of a gas 35. The fluid 20 may be water or other liquids, but water will be used as representative throughout this specification. The apparatus preferably includes a structural vessel 10 supporting the water 20 within it, and a means for mixing 25 of the water. The vessel 10 may be a tank, a barrel, a vertically oriented pipe, or other well known means for storing, directing or processing liquids, viscous fluids and even sludges. The vessel 10 may have an open top, may be vented, or it may be sealed as required by its use.

Figure 2:
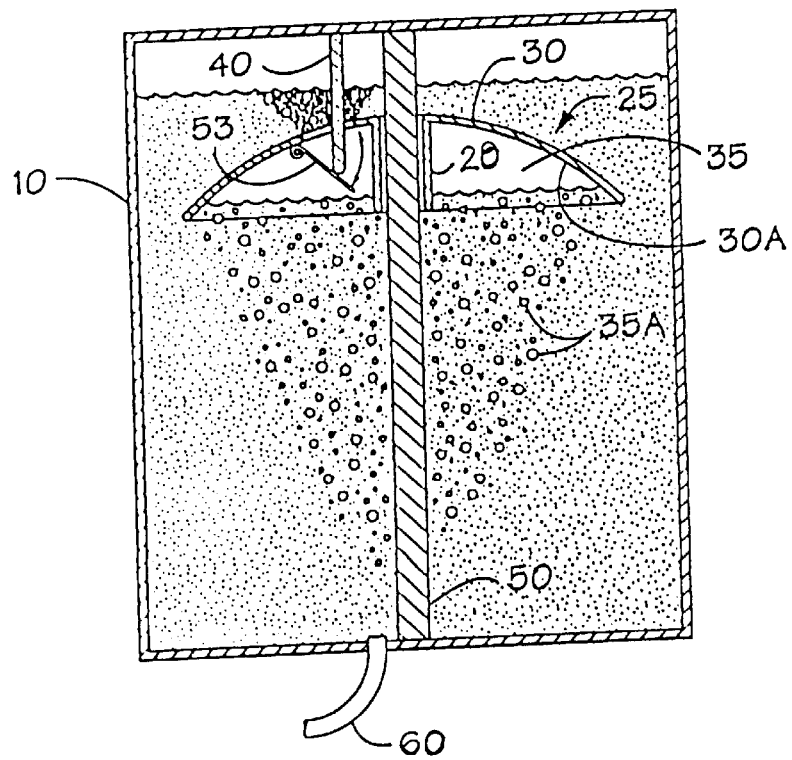
FIG. 2 is a mechanical schematic conception diagram as in FIG. 1, with the mixing device located near the top of the vessel, at the midpoint of a mixing cycle, wherein captured gas is released.
Figure 3:
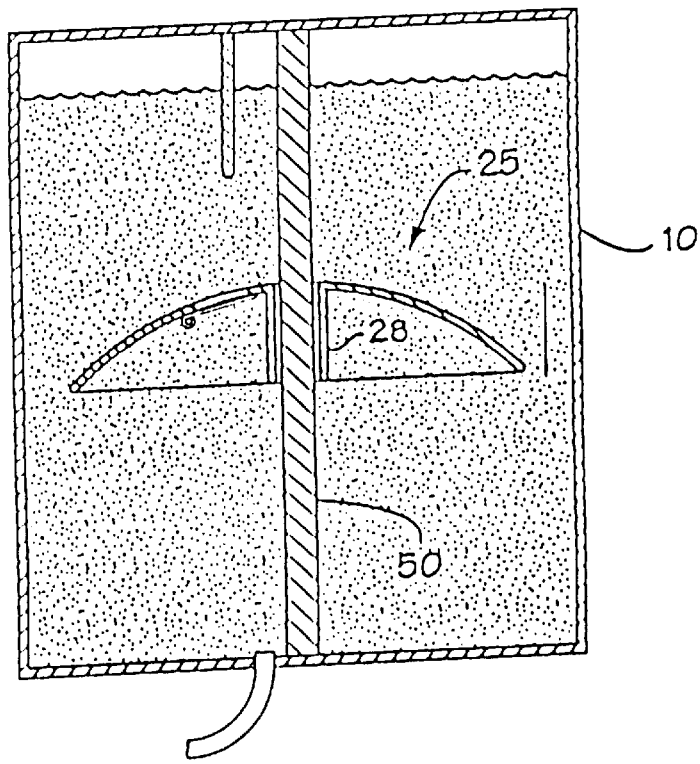
FIG. 3 is a mechanical schematic conception diagram as in FIG. 1, showing the mixing device falling through the liquid.

The mixing means 25, in one embodiment shown in FIGS. 1–3, provides a means for restraining gas bubbles 30, preferably shaped as a cap or an umbrella bonnet, that, as the gas 35 is introduced under the restraining means 30, the collected gas is naturally forced to remain under the restraining means 30 and therefore provides a buoyant force to it. The mixing means 25 preferably further includes a tubular shaped stabilizing means 28 centrally positioned on the restraining means 30 the restraining means extending outwardly annularly about the tubular stabilizing means 28. The use of "gas" and "gas bubbles" shall be used interchangably throughout and it is expected that the form of the gas; as bubbles within the liquid, as a gas pocket trapped under the restraining means 30, or as a gas flow within various equipment and conduits shall be understood from the context. The use of "gas" explicitly does not infer the portion of any gas within the system that is in the dissolved form within the liquid.

Alternatively, the present invention can be used to great advantage within a natural setting such as in an ocean, a bay, lake or pond. A mixing of the water 20 therein and in close proximity to the mixing means 25 of the invention might be used to advantage, as in clam or mussel beds or in fisheries for temperature control and for mixing and homogenizing algae or other additives, and the like.

A vertically oriented supporting means 50 such as one or more pole structures, tubes or other vertical structural elements, supports the mixing means 25 and, by sliding engagement of the stabilizing means 28 on the supporting means 50, enables the mixing means 25 to move vertically through the water 20. Therefore, the mixing means 25 slides upwardly and downwardly, guided by the supporting means 50. The water 20 is stirred or mixed by the movement of the mixing means 25.

The mixing means 25 provides a means for releasing 55 the gas 35 which has collected as a gas pocket under the restraining means 30 at any selected vertical position of the mixing means 25 on the supporting means 50. Thus with the gas 35 introduced under the restraining means 30, as shown in FIG. 1, the mixing means 25 rises in the vessel 10 due to the buoyancy of the gas 35, and with release of the gas 35, as shown in FIG. 2, the mixing means 25 drops in the vessel 10, as shown in FIG. 3, due to the loss of buoyancy. It is clear, that for the mixing means 25 to drop when not buoyed-up by the gas 35, it should have negative buoyancy. As shown in FIG. 2, the preferred means by which the gas 35 is released from the restraining means 30, is a rigid downwardly directed arm 40 rigidly positioned to engage the releasing means 55. In this embodiment the arm 40 pushes open a hinged door 53 of the releasing means 55 so that the gas 35 trapped under the restraining means 30 may escape to the surface of the liquid 20.

The restraining means 30 preferably provides a surface means 30A formed concave upwardly, the surface means 30A being positioned for trapping the gas 35 below it. Further, a means for gas influx 60 into the restraining means 30 is provided. This gas influx means 60 might be a hose for delivering a gas as a controlled constant flow directly to the restraining means, as shown in FIG. 4, or it might release the gas at the bottom of the vessel or pond, etc., as shown in FIGS. 1–3, whereupon gas bubbles 35A float upwardly to be trapped under the restraining means 30, or it might be simply the chemical processes taking place within the liquid itself, which frequently results in the release of gas bubbles of nitrogen, hydrogen, or carbon dioxide gases or the like.

Figure 4:
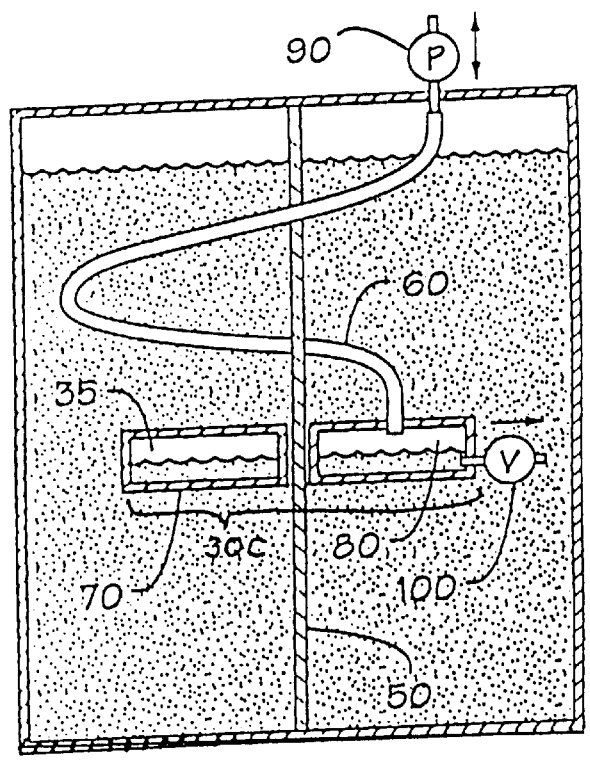
FIG. 4 is a mechanical schematic conception diagram showing a cross-sectional view of an alternate preferred embodiment of the present invention, including a pump that is used to adjust buoyancy.

Alternately, as shown in FIG. 4, the restraining means 30 may be a means for enclosing 70 such as a box or container, the enclosing means 70 providing a cavity means 80 therewithin, such as a space or void for encompassing the gas 35. The enclosing means 70 might be a hollow vessel having fixed walls, or an inflatable or flexible walled device. The enclosing means 70 may comprise a cup-shaped body 30 with a lower cover plate 30C attached to the cap-shaped body 30, the lower cover plate 30C, as shown in FIG. 4 enclosing the cap shaped body 30. In this alternate embodiment, the gas influx means 60 is used, as well, for gas withdrawal. In this case, the gas influx means 60 is preferably a hose or other umbilical means for gas influx and withdrawal, the influx and withdrawal means being functional for enabling gas flow into and out of the enclosing means 70 for changing the buoyancy of the mixing means, and is interconnected with the cavity means 80 and is functional for filling the cavity means 80 with the gas 35 and for exhausting the cavity means 80. The cavity means 80, preferably consists of one or more chambers filled with water 20 or alternately the gas. The enclosing means 70 is constructed such that when the cavity means 80 is filled with water 20, the enclosing means 70 sinks, and with the cavity means 80 filled with the gas 35, the enclosing means 70 rises due to the buoyant force of the gas 35. The embodiment shown in FIG. 4 requires a gas moving device 90 such as a pump. Such a pump must be able to move gas 35 into the cavity means 80 against the force of water pressure at the lowest depth to which the enclosing means 70 travels. A simple access aperture or a vent 100 is required in the enclosing means 70 so that the water 20 within the cavity means 80 is able to escape when forced out by incoming gas 35. Likewise as gas 35 is evacuated from the cavity means 80, it is necessary for the water 20 to be able to enter the cavity means 80 through vent 100. By changing the amount of water ballast held within the cavity means, it is possible to control the speed by which the mixing means moves through the liquid 20 and thus the vigorousness of mixing that takes place.

Figure 5:
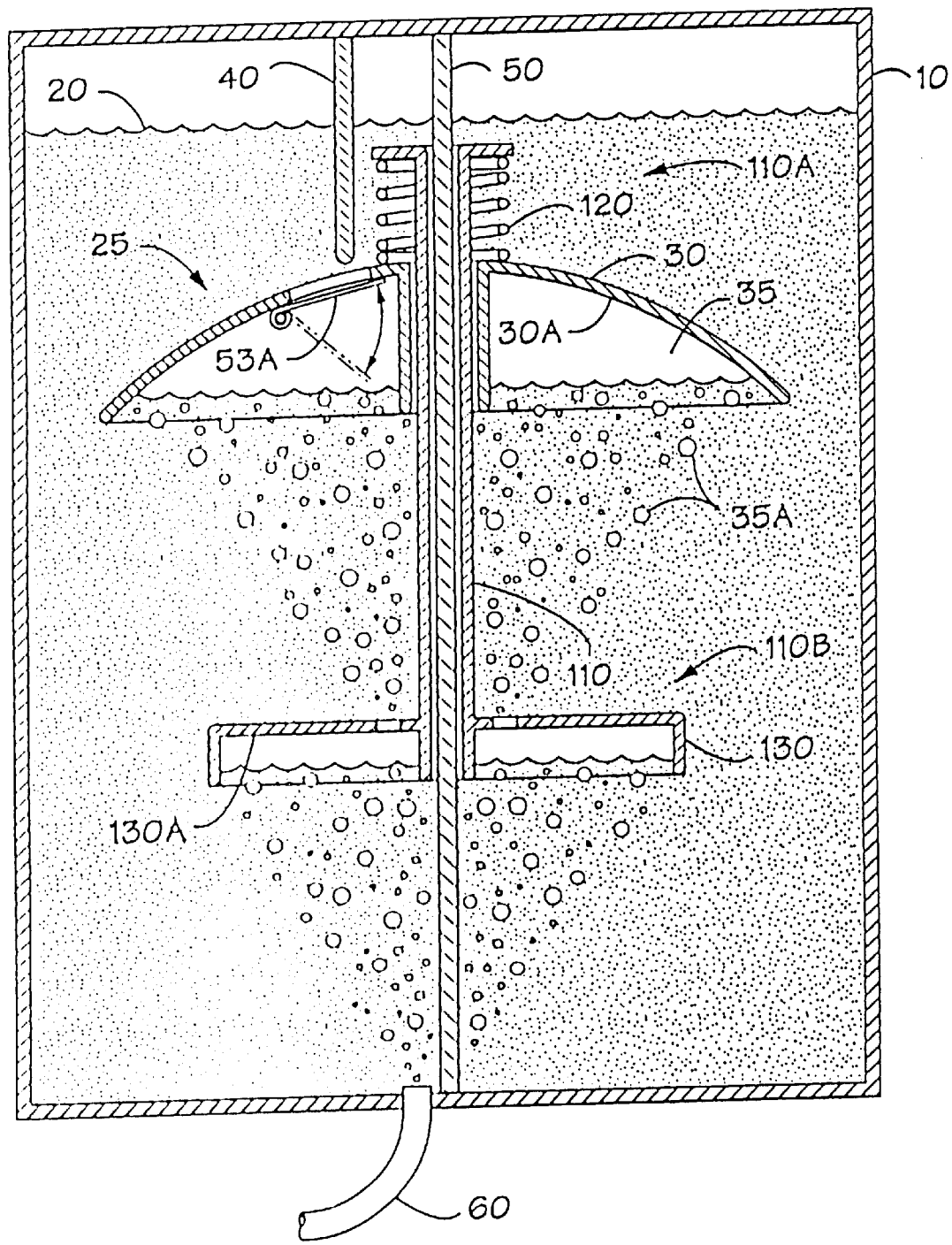
FIG. 5 is a mechanical schematic conception diagram showing a cross-sectional view of a further preferred embodiment of the present invention.

FIG. 5 depicts further details of a preferred embodiment of the present invention. The gas restraining means 30 is slidably engaged on a central tube assembly 110. The tube assembly 110, is in turn, slidably engaged on the supporting means 50. The upper end 110A of the central tube 110 provides a first means for shock absorption 120 such as a coil spring, and the lower end 110 B of the central tube assembly 110 provides a means for capturing gas bubbles 130, such as an annular skirt as shown. Such a bubble capturing means 130 provides a surface 130A positioned for a wide area contact with the bubbles 35A rising in the water 20 and is configured such that the bubbles 35A are moved toward and under the restraining means 30. In this manner the bubbles 35A rising in the liquid 20 are efficiently directed under the restraining means 30. Further, the capturing bubbles means 130 may be provided with sufficient weight and leverage distance from the restraining means 30, so as to act to maintain the upright orientation of the restraining means 30 which naturally tends to tip laterally or rotate, to spill some of the gas 35 collected under it. In this manner, the vertical supporting means 50 may be less robust acting merely to guide the mixing means 25 rather then as a structural member for preventing tipping of the restraining means 30.

When the mixing means 25, including the restraining means 30, and the tube assembly 110 are at the bottom of the vessel 10, the restraining means 30 moves into contact, or near contact, with the bubble capturing means 130. When the restraining means 30 starts to rise, as gas bubbles 35 provide buoyancy, the restraining means 30 moves upward along tube assembly 110 until it contacts the first shock absorption means 120 which cushions this physical contact. Further rising of the restraining means 30 moves the tube assembly 110 with it, as both parts slide upwardly guided by the supporting means 50.

Figure 12:
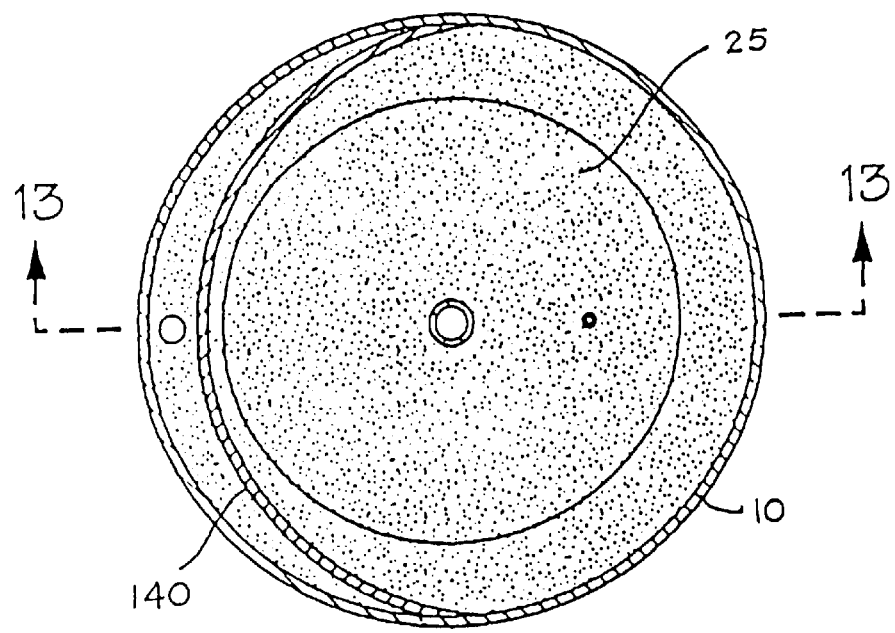
FIGS. 12 and 13 are similar to FIGS. 7 and 6 respectively and further showing a means for removing scum from the system.
Figure 13:
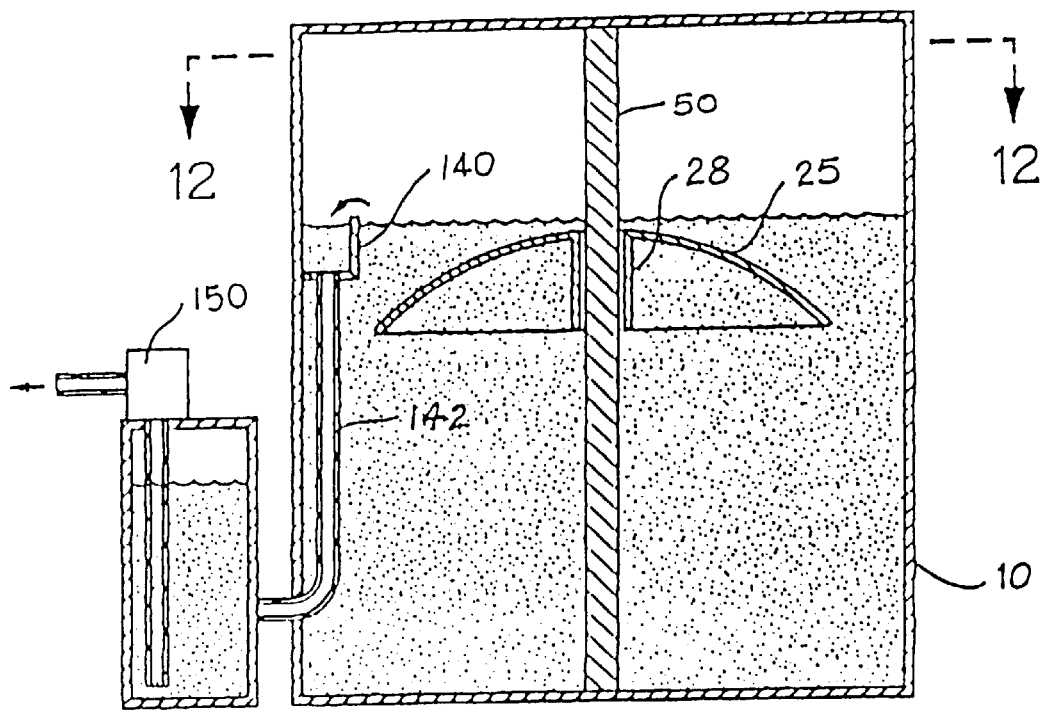

As shown in FIGS. 12 and 13, a weir wall 140 may be positioned for enabling any sludge or scum (not shown) generated on, or floating on, the water's surface to flow over the weir wall 140 when the mixing means 25 approaches the surface. The surfacing of the mixing means 25 typically causes a surface wave to develop and such is the means for forcing such surface elements to move over the weir wall 140. The sludge, then falls by gravity through a sludge conduit or pipe shown as 142 in FIG. 13. A sludge pump 150 is interconnected for removing the sludge from vessel 10.

Figure 7:
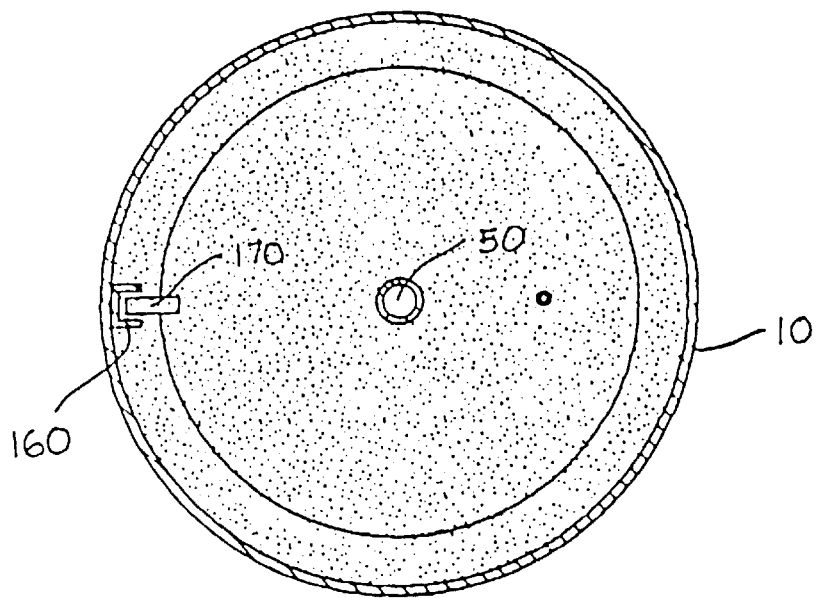
FIG. 7 is a top plan view of FIG. 6.
Figure 6:
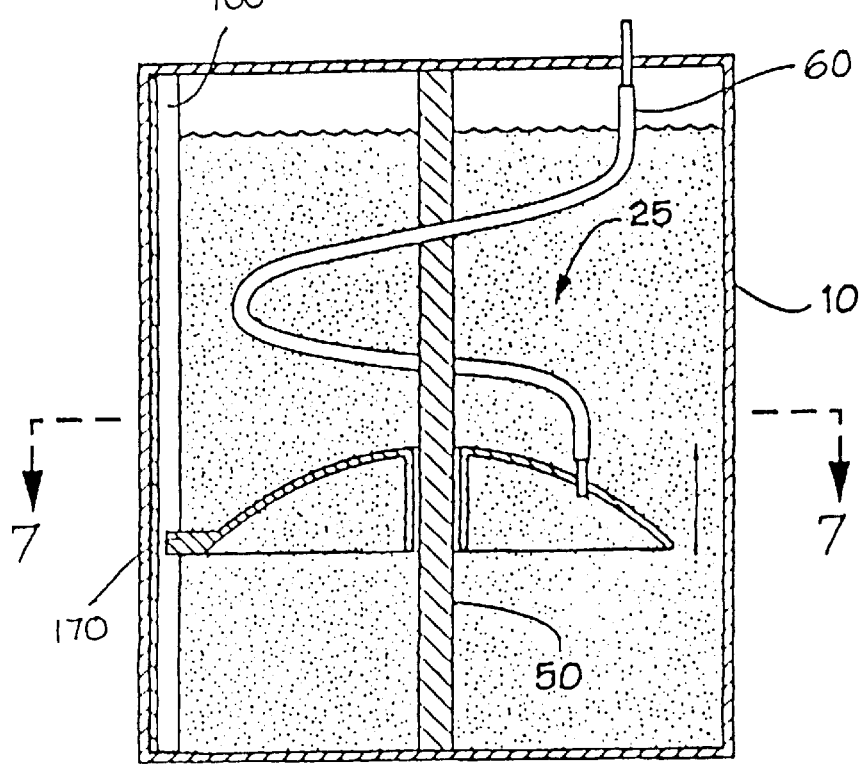
FIG. 6 is a mechanical schematic conception diagram as in FIG. 3 showing a means for preventing lateral movement of the device.

As shown in FIGS. 6 and 7, the apparatus may further include a vertically oriented track means 160 such as a U-shaped rail, positioned for engaging a track engagement means 170 such as the track engagement arm fixed to the restraining means 30. The track engagement means 170 slides within the track means 160 and is engaged therein so as to prevent lateral motion of the restraining means 30, i.e., so that it cannot move laterally, or rotate about the supporting means 50.

Figure 10:
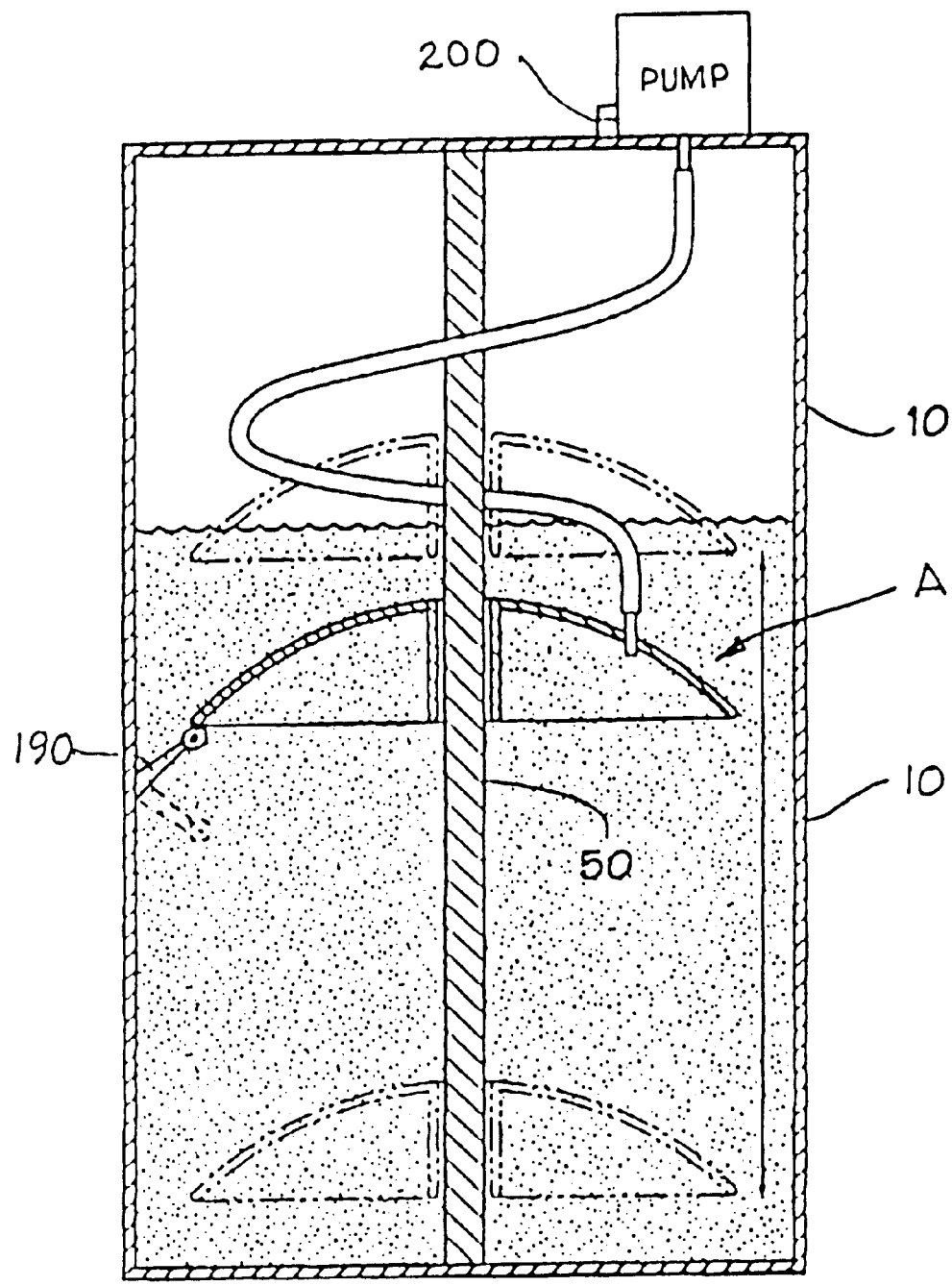
FIG. 10 is a mechanical schematic conception diagram illustrating a means for controlled deployment of the mixing means of the invention.

As shown in FIG. 10, the apparatus may advantageously employ a means for limiting 180 of the amount of gas 35 within the cavity or under the restraining means 30. The limiting means 180 preferably comprises a limit switch 190 and a pump shutdown switch 200 operably interconnected such that with the restraining means 30 in a selected position (position "A") the limit switch 190 is actuated by the restraining means 30 thereby enabling the pump shutdown switch 200 to halt further flow of gas 35 from the cavity. This embodiment therefore controls the buoyancy of the mixing means. For instance, if desired, one may select to have mixing occur only in the upper portion of the vessel 10.

Figure 9:
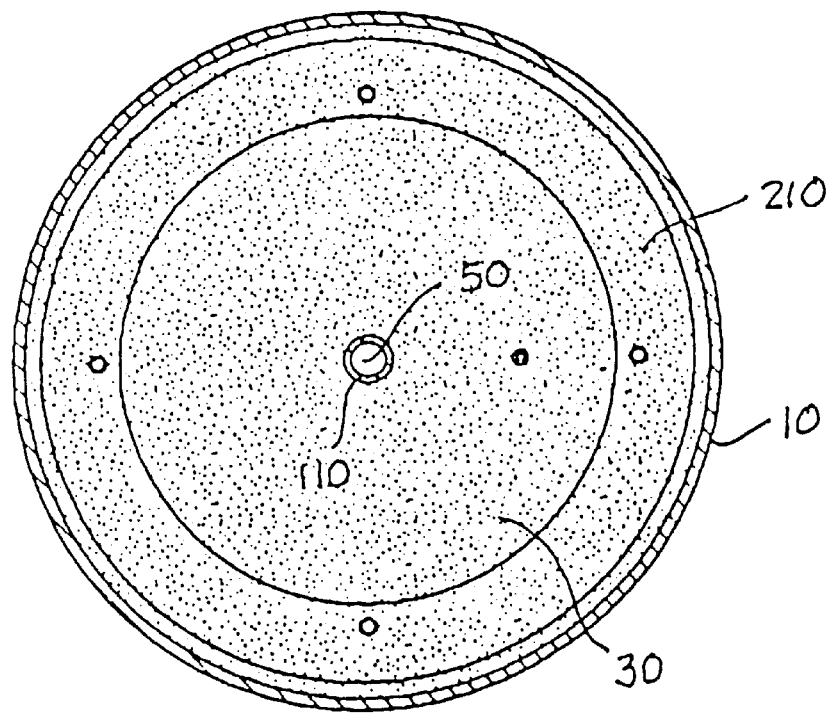
FIGS. 8 and 9 are similar to FIGS. 6 and 7 respectively and further illustrating a add-on means for improved fluid mixing.
Figure 8:
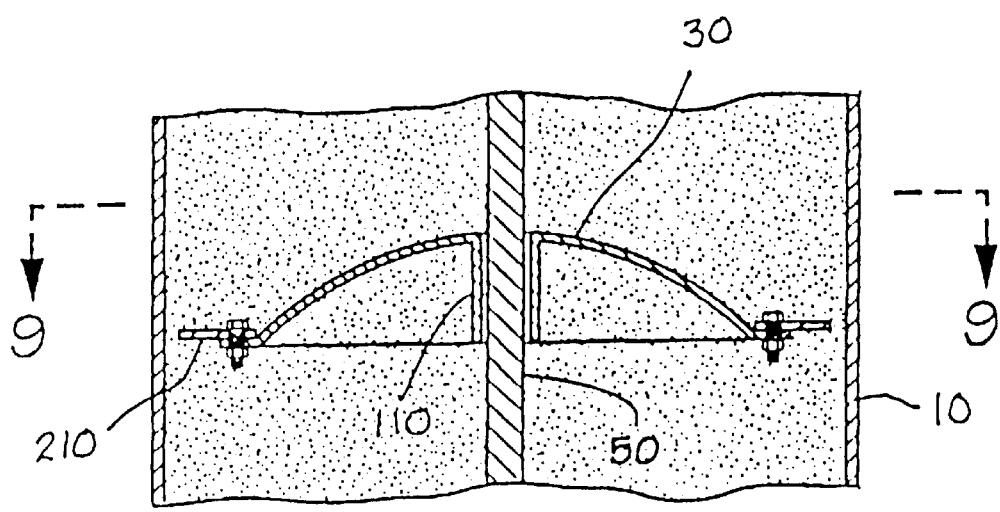

As shown in FIGS. 8 and 9, the apparatus may include an extension ring 210 removably engagable with the restraining means 30 so as to extend or alternately, limit the lateral girth of the mixing means for improved mixing action.

Figure 11:
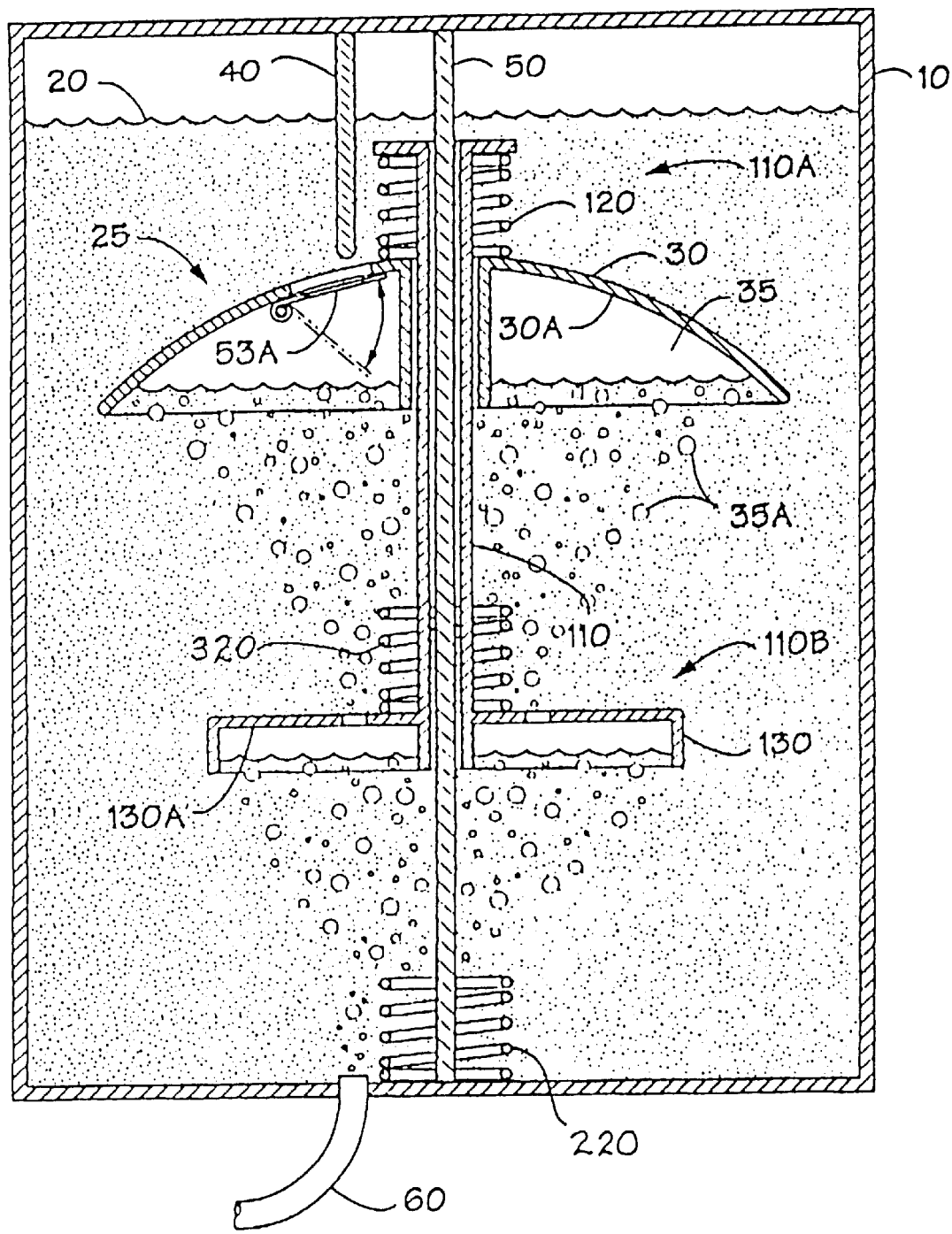
FIG. 11 is similar to FIG. 5 and further showing shock absorbing means.

As shown in FIG. 11 the apparatus may further include a second energy absorption means 320 fixed at a position below the bubble capture means 130 so as to set the lower limit of travel of the restraining means 30. In addition to limiting the travel of the mixing means 25, a third energy absorption means 220 prevents collisions between the mixing means 25 and the bottom of the tank or pond, etc.

Figure 14:
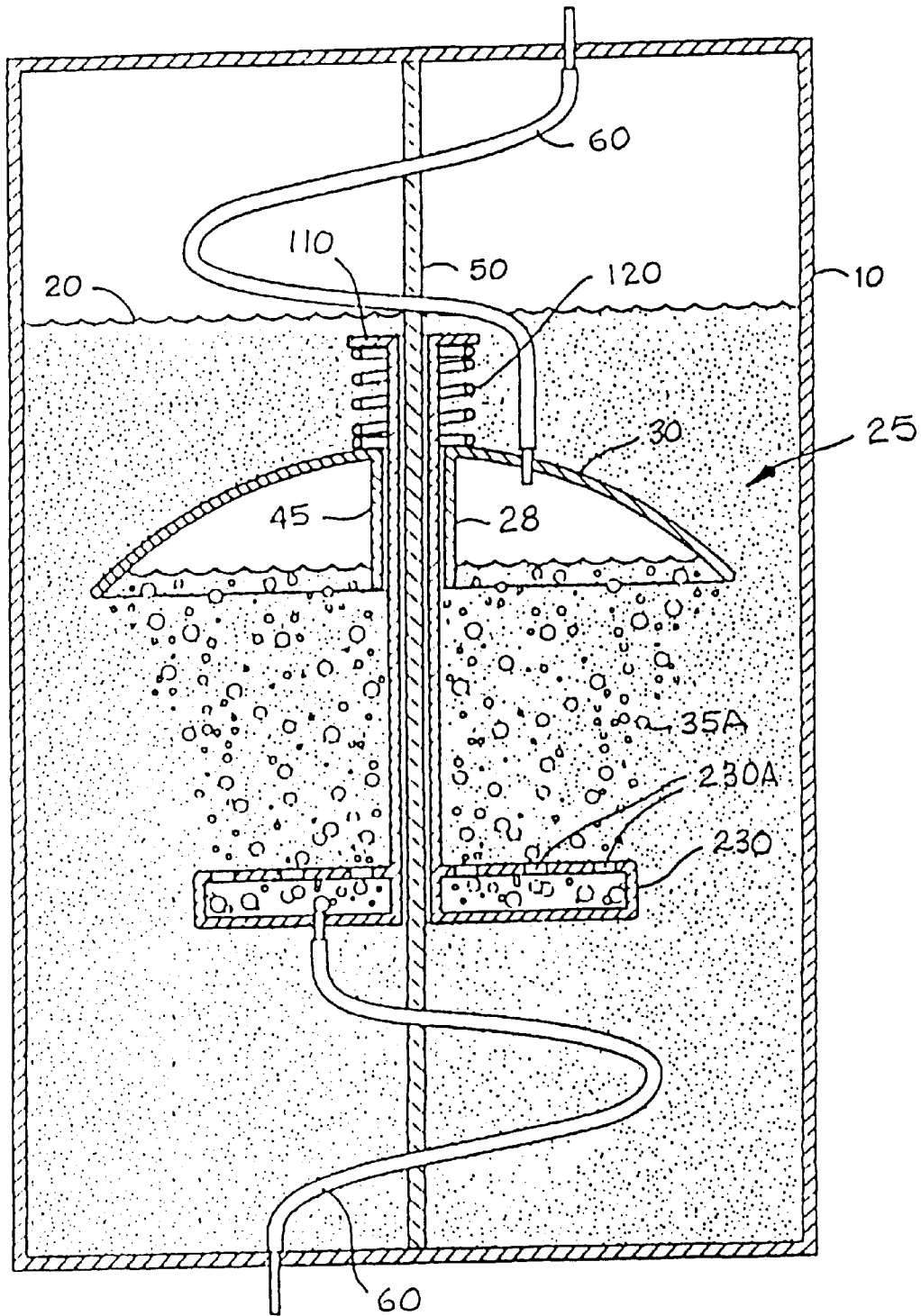
FIG. 14 is similar to FIG. 5 and showing a further means for the employment of gas bubbles in the system.
Figure 15:
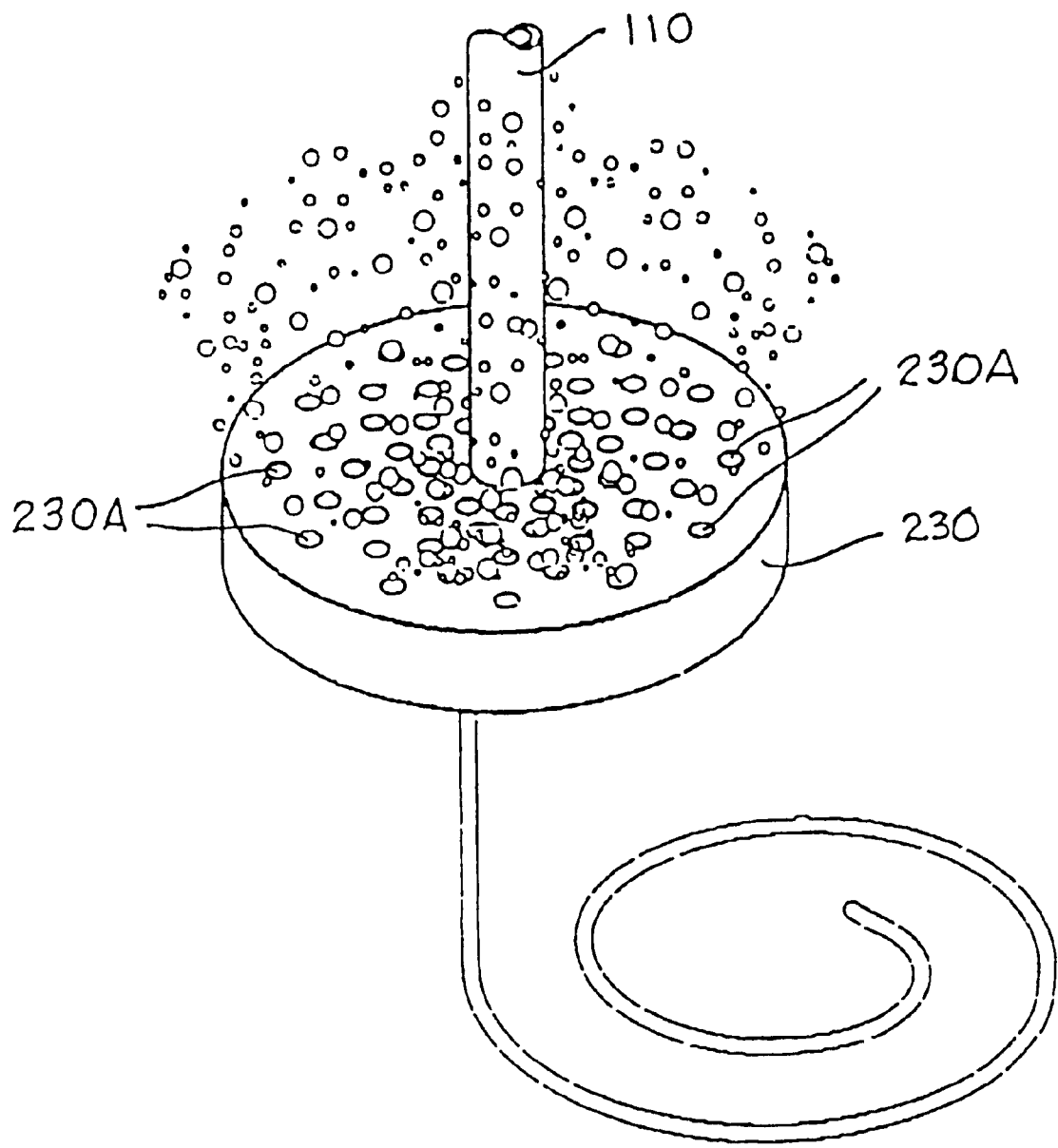
FIG. 15 is a perspective view of a gas bubble distributing means shown in FIG. 14.

As shown in FIG. 14 the apparatus may further including a gas bubble dispersing means 230 fixed to the central tube assembly 110 and positioned under the restraining means 30, the gas bubble dispersing means 230 being positioned for directing gas bubbles 35A upwardly into the restraining means 30. A continuous flow of gas 35 may be pumped into the bubble dispersing means 230 via means for gas influx 60, as shown in the figure, so that the buoyancy of the mixing means 25 is directly controlled throughout the process. FIGS. 14 and 15 show the preferred embodiment wherein the dispersing means 230 is a container mounted for moving with the mixing means 25, and indeed contributes to the mixing process itself. Such a container preferably has holes 230A on an upfacing surface for distributing gas bubbles 35A toward the restaining means 30.

The method of the invention induces mixing a viscous fluid, by providing a means for mixing the viscous fluid, the mixing means having negative buoyancy and further providing a means for restraining a gas for providing positive buoyancy thereto, and a vertically oriented pole structure supporting means, the mixing means being slidably engaged with the supporting means for vertical movement of the mixing means along the supporting means; releasing the gas from the restraining means at a selected vertical position of the mixing means on the supporting means so as to defeat buoyancy thereto enabling the mixing means to sink in the fluid; injecting the gas into the fluid from below the mixing means enabling the mixing means to capture the gas so as to increase the buoyancy thereof thereby enabling the mixing means to rise in the fluid; and then repeating these steps continuously or intermitently for mixing the fluid. The method may also include the step of breaking-up scum and foam floating on the fluid with the mixing means each time it surfaces.

While the invention has been described with reference to at least one preferred embodiment, it is to be clearly understood by those skilled in the art that the invention is not limited thereto. Rather, the scope of the invention is to be interpreted only in conjunction with the appended claims. The structures shown in the drawing are only several of the almost infinite possible manifestations or embodiments of the present invention. For instance, the vertical pole guide might be more or less robust, might be round, square or other shaped in cross section, and might be multiple elements instead of a singular element. The gas restraining means might be multiple cap-shaped devices rather then one. Instrumentation of value might be added to the invention for control of cycle rate and other process variables.

What is claimed is:

1. An apparatus for mixing a viscous fluid within which the apparatus moves, the apparatus comprising:

a means for mixing the viscous fluids, the mixing means having negative buoyancy and comprising a means for restraining a gas for providing positive buoyancy to the mixing means, the restraining means configured as a cap shaped body having a tubular stabilizing means centrally disposed therein, the cap-shaped body extending laterally outwardly from the tubular stabilizing means;

a vertically oriented pole structure supporting means, the tubular stabilizing means being slidably engaged on the pole structure supporting means for vertical movement of the mixing means along the pole structure supporting means;

the mixing means further comprising a portal means for releasing the gas from the restraining means at a selected vertical position of the mixing means on the supporting means so as to reduce buoyancy of the mixing means;

whereby with the gas supporting the restraining means, the mixing means rises in the fluid along the pole structure supporting means due to buoyancy of the gas, and with release of the gas from the restraining means, the mixing means falls in the fluid due to the loss of said buoyancy;

the rising and falling of the mixing means providing mixing of the fluid.

2. The apparatus of claim 1 further including a means for gas bubble influx into the viscous fluid below the cap-shaped body.

3. The apparatus of claim 1 wherein the mixing means further comprises a lower cover plate attached to the cap-shaped body so as to form a cavity means therewithin for enclosing the gas bubbles therein.

4. The apparatus of claim 3 further including an umbilical means for gas influx and withdrawal, the influx and withdrawal means being functional for enabling gas flow into and out of the cavity means for changing the buoyancy of the mixing means.

5. The apparatus of claim 4 further including a means for limiting the amount of gas within the cavity, the limiting means comprising a limit switch and a pump shutdown switch operably interconnected such that with the mixing means in a selected position the limit switch is actuated by the mixing means thereby actuating the pump shutdown switch so as to halt further outflow of gas from the cavity means for controlling the buoyancy of the mixing means.

6. The apparatus of claim 1 further including a central tube assembly slidably engaged on the supporting means and vertically movable thereon, an upper end of the central tube assembly providing a first means for shock absorption and the lower end of the central tube assembly providing a means for capturing the gas; the restraining means being slidably engaged on the central tube assembly and vertically movable thereon between the first shock absorption means and the gas capturing means, the first shock absorption means restraining the range of vertical motion of the restraining means.

7. The apparatus of claim 6 wherein the gas capturing means is positioned for operably neutralizing forces of rotation acting on the restraining means due to gas collected thereunder said rotation forces tending to spill the gas from the restraining means.

8. The apparatus of claim 6 further including a second means for shock absorption positioned between the restraining means and the gas capturing means so as to prevent collisions therebetween.

9. The apparatus of claim 8 further including a third energy absorption means fixed at a position below the restraining means so as to establish a lower limit of travel of the mixing means.

10. The apparatus of claim 1 further including a weir wall positioned laterally to the mixing means and extending above a surface of the fluid in such a position as to enable sludge generated on the surface of the viscous fluid to flow over the weir wall due to motion of the mixing means through the fluid.

11. The apparatus of claim 10 further including a sludge pump interconnected for removing the sludge moving over the weir wall.

12. The apparatus of claim 1 further including a vertically oriented track means positioned in parallel with, and laterally from the vertically oriented pole structure supporting means for engaging a track engagement means fixed to the mixing means, the track engagement means sliding within the track means and engaged therein so as to prevent lateral and rotational motion of the mixing means.

13. The apparatus of claim 1 further including an extension ring removably engagable with the restraining means so as to extend the lateral girth of the mixing means for increasing the mixing action of the mixing means within the viscous fluid.

14. The apparatus of claim 1 further including a gas bubble dispersing means affixed to the vertically oriented pole structure supporting means and positioned under the restraining means, the gas bubble dispersing means being positioned for directing gas bubbles upwardly through the viscous fluid toward the restraining means.

15. A method for mixing a viscous fluid, the method comprising the steps of:

a) providing a vertically movable mixing means having negative buoyancy in a fluid;

a') enabling a gas to flow under the mixing means to provide positive buoyancy thereto in the fluid;

b) releasing the gas from the mixing means at a selected vertical position of the mixing means so as to reduce buoyancy thereof for enabling the mixing means to sink in the fluid;

c)

d) repeating steps (a') and (b) for continuously or intermittently mixing the fluid;

e) setting the selected vertical position of step (b) such that the mixing means is able to break-up naturally forming scum and foam floating on the fluid;

f) positioning a weir wall laterally to the mixing means and at such a height above a surface of the fluid as to enable the scum and foam to be projected over the weir wall by the motion of the mixing means through the fluid.

* * * * *